July 19, 1960 L. G. MAGILL 2,945,748
APPARATUS FOR CONVERTING HYDROGEN SULFIDE TO SULFUR
Filed April 23, 1958
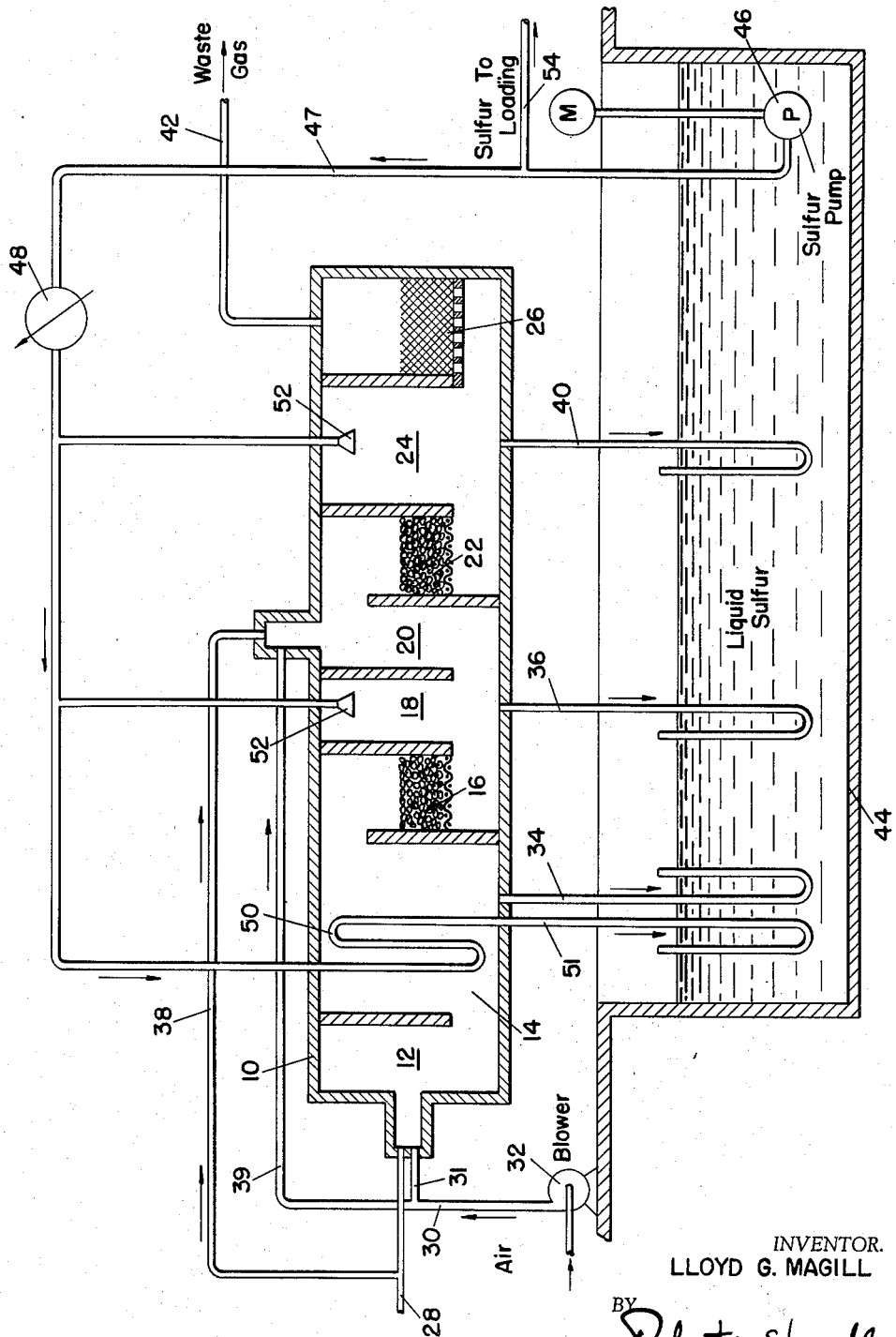
INVENTOR.
LLOYD G. MAGILL
BY
Robert O. Spindle
ATTORNEY United States Patent Office 2,945,748
Patented July 19, 1960

2,945,748

APPARATUS FOR CONVERTING HYDROGEN SULFIDE TO SULFUR

Lloyd G. Magill, Berwyn, Pa., assignor to Sun Oil Company, Philadelphia, Pa., a corporation of New Jersey Filed Apr. 23, 1958, Ser. No. 730,392

5 Claims. (Cl. 23—288)

This invention relates to new and improved apparatus for the recovery of sulfur, and particularly for the recovery of elemental sulfur from hydrogen sulfide gas.

The gases obtained from refining crude oil and in the purification of natural gas usually contain large proportions of sulfur in the form of hydrogen sulfide. For many years it was the practice to burn such gases to dispose of them, but this has been increasingly undesirable, especially in more populated areas, because of the odor and the effect of the flue gases on plant and animal life. Recently, therefore, various processes have been developed for the recovery of sulfur from such gases. The most commonly used process is that which comprises the catalytic oxidation of hydrogen sulfide to form elemental sulfur. This reaction is presumed to take place in two steps, as follows.

(1) $H_2S + 3/2 O_2 \rightarrow SO_2 + H_2O$ (2) $SO_2 + 2H_2S \rightarrow 3S + 2H_2O$ According to the usual process, Reaction 1 is carried out in a combustion chamber where sufficient air or other oxygen-containing gas is introduced to burn one-third of the total hydrogen sulfide. The hot gases from the combustion chamber are passed through a heat exchanger to reduce the temperature to around 600° F., and are then passed to a converter. The converter contains a catalyst which effects the second reaction. This reaction is highly exothermic, so the gases, containing vaporous sulfur, are then passed to another heat exchanger to condense sulfur. Generally, in order to obtain high yields, a two-stage process is used. After condensing sulfur formed in the first converter, the gases are reheated and passed through a second converter. This is followed by a second condensing of sulfur. The waste gases are then usually passed through a scrubber to remove any sulfur vapors which may have been carried over.

It is apparent from the above description that a large number of units are required to carry out the process. A combustion chamber, two converters, at least three heat exchangers, a reheating unit, and a scrubber are the minimum. Such a large number of pieces of equipment necessitates a high initial investment, not only in the units themselves, but in the extensive insulated piping required to connect the units.

It is therefore an object of this invention to provide new apparatus for the conversion of hydrogen sulfide to sulfur. Other objects and their achievement in accordance with this invention will become apparent hereinafter.

According to the present invention, the entire process of converting hydrogen sulfide to sulfur is performed in a single vessel. The use of large insulated piping for the conveyance of hot gases between various pieces of equipment is completely avoided.

For a better understanding of the invention, reference is now made to the attached drawing, which shows the apparatus of the present invention, together with related equipment, in somewhat diagrammatic form.

Vessel 10 is a horizontally elongated insulated vessel which encloses a first combustion zone 12, a first heat exchanging zone 14, a first catalyst bed 16, a second heat exchanging zone 18, a second combustion zone 20, a second catalyst bed 22, a third heat exchanging zone 24, and a coalescer 26. Hydrogen sulfide feed gas in line 28 is fed into the vessel 10 at one end of the first combustion zone 12, where it is mixed with air supplied through lines 30 and 31 by blower 32. The air supply is regulated so that one-third of the hydrogen sulfide is oxidized to sulfur dioxide in the first combustion zone. Extremely high temperatures up to about 2500° F. result from this combustion, so that it is desirable that the combustion zone be lined with a refractory material, as is known in the art.

A portion of the sulfur dioxide formed in the first combustion zone 12 reacts with hydrogen sulfide to form sulfur, some of which is condensed as the gases pass through the first heat exchanging zone 14. Condensed sulfur is removed through line 34. The temperature of the gases is reduced to about 450° F. to 650° F. in the first heat exchanging zone, and are passed through catalyst bed 16, where a large proportion of the remaining sulfur dioxide and hydrogen sulfide react to form sulfur, due to the catalytic activity of the material in the catalyst bed. Any of the well known catalysts which are effective to promote the reaction may be used. For example, bauxite, iron oxide, activated alumina, calcium sulfate, silica gel, and other materials may be used. The structure of such a catalyst bed is well known in the art, so that no detailed description is necessary here.

Upon passing through the catalyst bed, vaporous sulfur is condensed in the second heat exchanging zone 18, and the liquefied sulfur is removed through line 36. The temperature in the second heat exchanging zone is maintained at about 260° F. to 350° F. in order to condense as much as possible of the sulfur. The remaining gases are then passed to the second combustion zone, where additional hydrogen sulfide is introduced through line 38, along with sufficient air, introduced through line 39, to oxidize one-third of the additional hydrogen sulfide to sulfur dioxide, and is burned in the combustion zone in order to raise the temperature of the gases therein to the 450° F. to 650° F. range desired for their introduction to the second catalyst bed 22. After passing through the second catalyst bed, where substantially all of the remaining hydrogen sulfide and sulfur dioxide are reacted to form sulfur, the gases are passed through the third heat exchanging zone 24 to condense out the sulfur, which is removed through line 40. In this third heat exchanging zone the temperature is desirably maintained at from 260° F. to 350° F. The gases are then passed through coalescer 26 where any sulfur carried over is removed by contacting with Raschig rings or similar packing material. Waste gases, which are substantially free of hydrogen sulfide, sulfur dioxide and sulfur, are carried out through line 42 to a stack.

Sulfur drained from vessel 10 through lines 34, 36 and 40 is conveniently passed to a pit or other reservoir 44. In the embodiment shown in the drawing, this sulfur is taken from pit 44 by means of pump 46 and circulated, through line 47 and a heat exchanger 48, to the heat exchanging zones 14, 18 and 24. The sulfur is cooled in the heat exchanger 48 to about 260° F. to 300° F. to provide efficient cooling of the gases in heat exchanging zones 14, 18 and 24. In the embodiment of the invention shown in the drawing, a cooling coil 50 is used in zone 14, and this indirect heat exchanging means is preferred here in order to reduce the carryover of sulfur vapor into catalyst bed 16. In heat exchanging zones 18 and 24, however, lower temperatures prevail, and most efficient cooling can be obtained by direct contact, One or more spray heads 52 are therefore provided in each of these heat exchanging zones, and cooling of the gases and condensation of sulfur is effected by direct contact. The coolant from cooling coil 50 is removed through line 51 and returned to pit 44. The sprayed sulfur in heat exchanging zones 18 and 24 is returned to pit 44 through lines 36 and 40, respectively. Product sulfur is taken from the system through line 54.

Other coolants and cooling means may be used in the heat exchanging zones; however, the method just described is preferred because of its high efficiency.

Various controls and regulating means well known to those skilled in the art may be used with the apparatus of this invention in order to accurately control temperatures and pressures throughout the system, and to maintain the optimum ratio of hydrogen sulfide to sulfur dioxide for maximum production of sulfur.

The invention claimed is:

1. In apparatus for converting hydrogen sulfide to sulfur and which comprises a first combustion zone, a first heat exchanging zone, a first catalyst bed, a second heat exchanging zone, a second combustion zone, a second catalyst bed, a third heat exchanging zone, and a coalescer, the improvement which comprises a single horizontally elongated insulated vessel enclosing all of said elements longitudinally spaced along said vessel in the order named, and means in said vessel for admitting hydrogen sulfide and oxygen to each of said combustion zones, means for admitting a coolant to each of said first, second, and third heat exchanging zones, means for removing said coolant, means for removing molten sulfur from said vessel, and means for removing waste gas.

2. Apparatus for converting hydrogen sulfide to sulfur comprising a single horizontally elongated, insulated vessel having means for admitting hydrogen sulfide and air thereto and enclosing a first combustion zone adjacent said admitting means, a first heat exchanging zone adjacent said combustion zone, a first catalyst bed adjacent said heat exchanging zone, a second heat exchanging zone adjacent said catalyst bed, a second combustion zone adjacent said second heat exchanging zone, means for admitting hydrogen sulfide and air to said second combustion zone, a second catalyst bed adjacent said second combustion zone, a third heat exchanging zone adjacent said second catalyst bed, a coalescer adjacent said third heat exchanging zone, means in each of said first, second, and third heat exchanging zones for admitting a coolant thereto, means for removing said coolant, means for removing molten sulfur from each of said heat exchanging zones, and means for removing waste gas.

3. Apparatus for preparing sulfur from hydrogen sulfide which comprises an enclosed, horizontally elongated, insulated vessel, means for admitting hydrogen sulfide and air to one end of said vessel, a first combustion zone in said vessel adjacent said admitting means, a first heat exchanging zone in said vessel adjacent and situated longitudinally of said vessel from said combustion zone, a first catalyst bed in said vessel adjacent and situated longitudinally of said vessel from said heat exchanging zone, a second heat exchanging zone in said vessel adjacent and situated longitudinally of said vessel from said catalyst bed, a second combustion zone in said vessel adjacent and situated longitudinally of said vessel from said second heat exchanging zone, means for admitting hydrogen sulfide and air to said second combustion zone, a second catalyst bed in said vessel adjacent and situated longitudinally of said vessel from said second combustion zone, a third heat exchanging zone in said vessel adjacent and situated longitudinally of said vessel from said second catalyst bed, a coalescer in said vessel adjacent and situated longitudinally of said vessel from said third heat exchanging zone, and adjacent the end of the vessel opposite to said one end thereof, means in each of said first, second, and third heat exchanging zones for admitting a coolant thereto, means for removing said coolant, means for removing molten sulfur from each of said heat exchanging zones, and means for removing waste gas from said coalescer.

4. Apparatus for converting hydrogen sulfide to sulfur comprising a single horizontally elongated, insulated vessel having means for admitting hydrogen sulfide and air thereto and enclosing a first combustion zone adjacent said admitting means, a first heat exchanging zone adjacent said combustion zone, and indirect heat exchanger in said heat exchanging zone, a first catalyst bed adjacent said heat exchanging zone, a second heat exchanging zone adjacent said catalyst bed, means for spraying liquid coolant into said second heat exchanging zone, a second combustion zone adjacent said second heat exchanging zone, means for admitting hydrogen sulfide and air to said second combustion zone, a second catalyst bed adjacent said second combustion zone, a third heat exchanging zone adjacent said second catalyst bed, means for spraying liquid coolant into said third heat exchanging zone, a coalescer adjacent said third heat exchanging zone, means for removing molten sulfur from each of said heat exchanging zones, and means for removing waste gas.

5. Apparatus for converting hydrogen sulfide to sulfur comprising a single horizontally elongated, insulated vessel having means for admitting hydrogen sulfide and air thereto and enclosing a first combustion zone adjacent said admitting means, a first heat exchanging zone adjacent said combustion zone, a cooling coil in said heat exchanging zone, a first catalyst bed adjacent said heat exchanging zone, a second heat exchanging zone adjacent said catalyst bed, means for spraying liquid sulfur into said second heat exchanging zone, a second combustion zone adjacent said second heat exchanging zone, means for admitting hydrogen sulfide and air to said second combustion zone, a second catalyst bed adjacent said second combustion zone, a third heat exchanging zone adjacent said second catalyst bed, means for spraying liquid sulfur into said third heat exchanging zone, and a coalescer adjacent said third heat exchanging zone; means for removing liquid sulfur from said vessel, a reservoir for said liquid sulfur, means for cooling said liquid sulfur, means for transferring said liquid sulfur from said reservoir, through said cooling means, to said cooling coil and each of said spraying means, and means for removing waste gas from said vessel.

References Cited in the file of this patent

UNITED STATES PATENTS

| | | |
|---|---|---|
| 2,497,095 | Nevins et al. | Feb. 14, 1950 |
| 2,758,913 | Pearce | Aug. 14, 1956 |